Patented Nov. 4, 1947

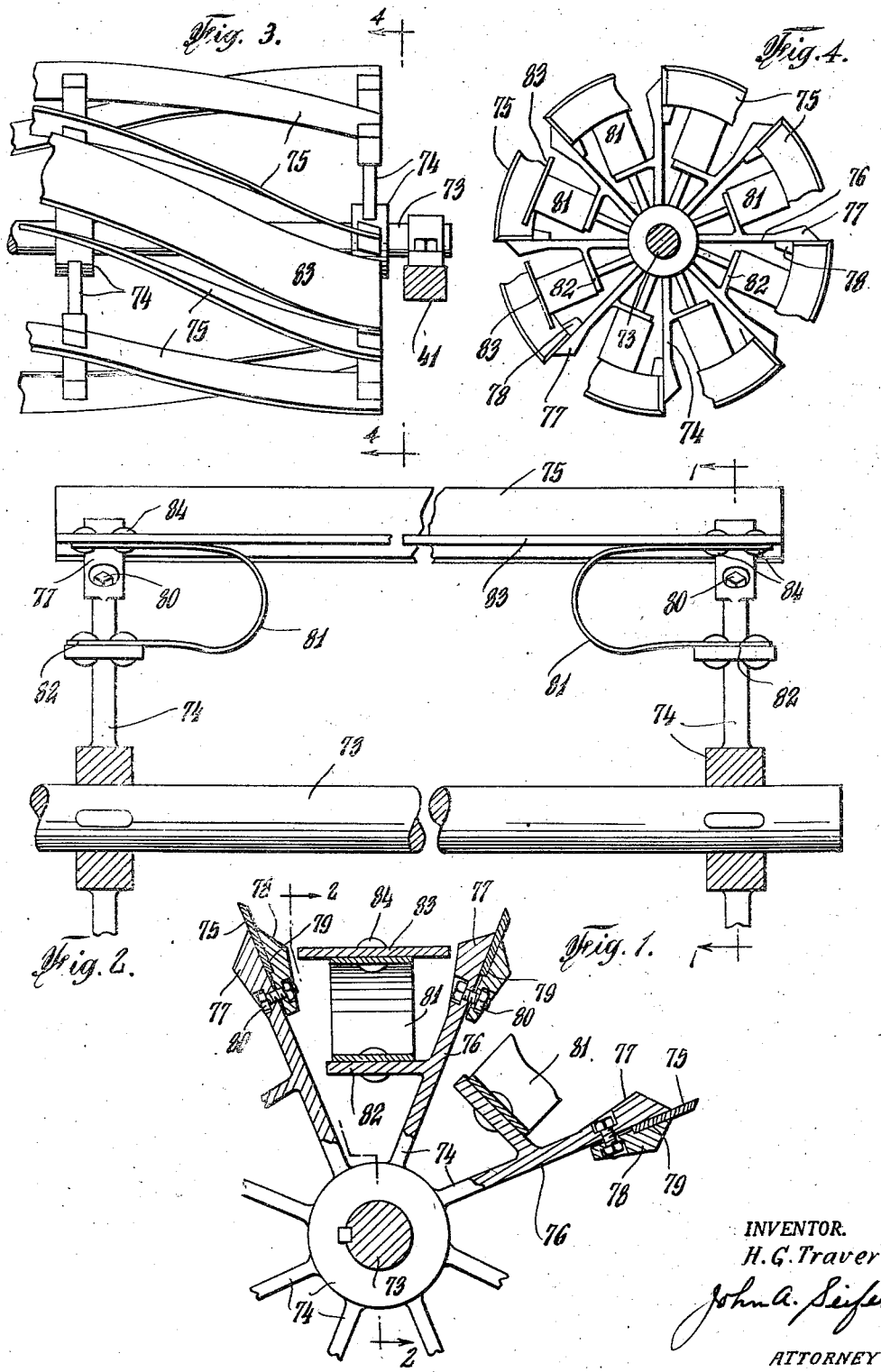

2,430,148

UNITED STATES PATENT OFFICE 2,430,148

ROTARY TRASH CUTTER AND TILLING APPARATUS

Harry G. Traver, Cranford, N. J.

Original application March 31, 1944, Serial No. 528,937. Divided and this application June 1, 1945, Serial No. 597,112

8 Claims. (Cl. 97—212)

1

This invention relates to agricultural apparatus for working and tilling the land or ground and preparing the same for seeding and raising of crops, and particularly to means to cut and reduce the size of a cover crop or other vegetation, such as green manure, stalks and trash, forwardly of means to work and loosen the land to facilitate the mixing and working of such vegetation with the land by the land working and loosening means, the present application being a division of my co-pending application Serial No. 528,937, filed March 31, 1944.

It is an object of the invention to provide in land working and tilling apparatus of this character means rotatably carried by a supporting structure forwardly of the land working and loosening means to cut and reduce the size of vegetation, such as green manure, stalks and trash, transversely of the path of movement of the land working and loosening means to facilitate the mixing and working of such material into the soil by said land working and loosening means.

It is another object of the invention to provide means carried by the vegetation cutting means operative by cut vegetation and other material accumulating on said cutting means to clear such material from said cutting means.

Other objects and advantages of the invention will hereinafter appear.

In the drawing accompanying and forming a part of this application,

Figure 1 is a fragmentary cross sectional view of part of the vegetation cutting means taken on the line 1—1 of Figure 2 looking in the direction of the arrows and showing means for removing from the cutting means cut vegetation and other foreign substances accumulated thereon.

Figure 2 is a sectional view taken on the line 2—2 of Figure 1 looking in the direction of the arrows.

Figure 3 is a view of an end portion of a modified vegetation cutting means.

Figure 4 is a sectional view taken on the line 4—4 of Figure 3 looking in the direction of the arrows and showing means mounted on arms carrying vegetation cutting blades for removing from the blades vegetation and other foreign substances accumulated thereon.

The embodiment of the invention illustrated in the drawing for carrying out the invention comprises means to facilitate breaking and working of stubble land, or land having a cover crop, such as oats, rye or other vegetation to consti-

2 tute green manure, by laying such vegetation over the ground and cutting the same into relatively small size and thus facilitating not only the breaking of the land but also the mixing of the cut vegetation with the land by land working and loosening means. Said cutting means comprises a shaft 73 journaled in bearings fixed on side members of a frame 41 forwardly of the land working and loosening means supported by said frame, as shown in my co-pending application. Spiders 74 including a hub with arms extending radially therefrom and equidistantly spaced about the same are mounted on and rotatable with the shaft 73 adjacent each end thereof, and one or more of such spiders may be mounted on the shaft equidistantly spaced from the end spiders and each other. Cutting blades 75 are releasably mounted on the ends of the spider arms with the cutting edge portion of the cutting blades projecting from the end of the spider arms, as shown in Figures 1 and 2, and extending longitudinally and parallelly of the spider carrying shaft 73. To reinforce the end portion of the spider arms relative to which the cutting blades are mounted, the spider arms are made of increased thickness at the ends for which purpose one surface 76 of the spider arms is flat and extends to the end of the arms, and the other surface of the arms has a portion extending inwardly from the free end and diverging from said surface 76 and merging with a portion converging in a direction toward the spider arms, as shown at 77 in Figure 1. The cutting blades are juxtaposed to the flat side of the end portion of increased thickness of the spider arms by clamping members 78 conforming in shape in longitudinal section to the portion 77 of increased thickness of the spider arms and secured to said arms. The flat surface of the clamping members is recessed for the engagement of the cutting blades, said recesses extending inwardly from the end of the clamping members to an extent slightly greater than one-half of the width of the cutting blades and of a depth slightly less than the thickness of the cutting blades, as shown at 79. The cutting blades are clamped between said recessed portion and the flat surface of the spider arms with the cutting edge portion of the cutting blades projecting from the end of the spider arms by bolts 80, the heads and nuts of which bolts are disposed within recesses in the portion of increased thickness of the spider arms and the clamping members, as shown in Figure 1.

The vegetation cutting means 74, 75 rotates in a forward direction and the cutting blades during the cutting operation penetrate more or less into the surface of the land with the result that soil, particularly if the land is moist, and cut vegetation will accumulate upon and between the cutting blades and interfere with the cutting of the vegetation by the cutting blades. Means are provided to remove from the cutting blades soil or other material accumulating thereon rendered operative by the accumulation of such material on the cutting blades. For this purpose inwardly compressible and outwardly expansible means are carried by the cutting means disposed in the space between the spider arms adapted to be compressed by material as it accumulates on the cutter means during the cutting operation and to expand as the cutting blades move out of cutting position and operate to remove the material from the cutter means. This means, as shown in Figures 1 and 2, comprises U-shaped yielding members 81 of resilient flat material fixed at one end, as by riveting, to projections extending from one side of the spider arms, as at 82, and disposed with the U-portion of the members 81 extending toward each other, and the other end of said members disposed above the end portion fixed to the arm projections 82, as shown in Figure 2. Plates 83 extend between yielding members 81 carried by adjacent spider arms and are fixed to the upper end of said yielding members, as by riveting, as shown at 84, the plates 83 being normally disposed in line with and of a length equal to the cutting blades and of slightly less width than the distance between the outer surface of the clamping members 78 and the portion of increased thickness 77 of the spider arms, as shown in Figure 1. As the cutting blades 75 cut the vegetation and penetrate into the land, the soil and cut vegetation accumulation on or between the cutting blades will exert a force on the plates 83 acting to compress and increase the tensional stress of the resilient supporting members 81 which acts as the cutting blades move out of cutting position to exert a resilient outward force on the plates 83 to move said plates outwardly and remove material accumulated on and between the cutting blades.

In Figures 3 and 4, there is shown a modified form and which may comprise the preferred form of the cutter means for cutting a cover crop and other vegetation. The cutter means is substantially the same as that shown in Figures 1 and 2 except that the cutting blades 75 are of spiral form, and to mount the cutting blades on the spider arms 74 the spiders are mounted on the carrying shaft 73 with the spider arms of successive spiders offset circumferentially relative to the spider arms of a preceding spider and thus accommodating the spider arms to the pitch of the cutting blades. The spider arms also carry the resilient supports 81 for the plates 83 disposed between the spider arms and operative for removing from the cutter blades soil and cut vegetation accumulated on and between the cutting blades.

Having thus described my invention, I claim:

1. In agricultural apparatus, means for cutting and laying over a cover crop and other vegetation, comprising a rotatable support, cutting blades mounted on the support to extend longitudinally of the support and in radial and circumferentially spaced relation to the axis of the support, U-shaped members of resilient material fixed at one end portion to the rotatable support below the blades and the free end portions of the U-shaped members extending in the plane of the blades, and plates mounted on the free end portions of the U-shaped members to extend between and inwardly of the cutting blades and adapted to compress the U-shaped members by an accumulation of cut vegetation and other material on the cutting blades during the cutting operation and to be moved outwardly by the U-shaped members to remove said accumulated vegetation and other material from the cutting blades during the movement of the cutting blades out of cutting position.

2. Agricultural apparatus as claimed in claim 1, wherein the U-shaped members are mounted on the rotatable support with the U-portions extending toward each other.

3. In agricultural apparatus, means for cutting and laying over a cover crop and other vegetation, comprising a rotable shaft, hubs fixedly mounted on the shaft in equi-distantly spaced relation and having arms extending radially from and equi-distantly spaced about the hubs, cutting blades releasably mounted on the free end portions of the arms to extend longitudinally of the shaft with the cutting edge portion projecting from the ends of the arms, resilient members mounted at one end on the arms between the hubs and cutting blades, and plates mounted on the free end portions of the resilient members to extend between and inwardly of the cutting edge portions of the cutting blades and adapted to compress the resilient members by an accumulation of cut vegetation and other material on the cutting blades during the cutting operation and to be moved outwardly by the resilient members to remove said accumulated vegetation and other material from the cutting blades during the movement of the cutting blades out of cutting position.

4. Agricultural apparatus as claimed in claim 1, wherein the cutting blades are releasably mounted on the arms by clamping members having a recess in one face extending from an intermediate portion to one end to receive the blades and the opposite end releasably secured to the arms.

5. In agricultural apparatus as claimed in claim 3, wherein the free end portions of the arms are of increased thickness tapering to the free end to reinforce said end portions of the arms, and the cutting blades are releasably mounted on the arms by clamping members conforming to the shape of the free end of the arms and having a recess in one face extending from an intermediate portion to one end to receive the cutting blades, and a bolt engaged in the arms and the opposite end portion of the clamping members to releasably secure the clamping members to the arms.

6. Agricultural apparatus as claimed in claim 3, wherein the arms are arranged with projections extending from one side of the arms intermediate the ends thereof and the resilient members are mounted on said projections.

7. Agricultural apparatus as claimed in claim 3, wherein the arms are arranged with projections extending from one side of the arms intermediate the ends thereof, and the resilient members are of U shape with one end portion mounted on the arm projections and the opposite end portions engaged by the plates.

8. In agricultural apparatus, means for cutting and laying over a cover crop and other vegetation, comprising a rotatable carrier, spiral cutting blades releasably secured to the carrier in radial and circumferentially spaced relation to the axis of the carrier, U-shaped members of resilient material fixed at one end portion to the rotatable carrier inwardly of the blades and the free end portions of the U-shaped members extending in the plane of the blades, and plates mounted on the free end portions of the U-shaped members to extend between and inwardly of the cutting blades and adapted to compress the U-shaped members by an accumulation of cut vegetation and other material on the cutting blades during the cutting operation and to be moved outwardly of the U-shaped members to remove said accumulated vegetation and other material from the cutting blades during the movement of the cutting blades out of cutting position.

HARRY G. TRAVER.

REFERENCES CITED

The following references are of record in the file of this patent:

UNITED STATES PATENTS

| Number | Name | Date |
|---|---|---|
| 994,725 | Denson | June 13, 1911 |
| 627,474 | Brouk | June 27, 1899 |
| 747,118 | Barker | Dec. 15, 1903 |
| 1,606,324 | Short | Nov. 9, 1926 |